Patented Oct. 17, 1939

2,176,859

UNITED STATES PATENT OFFICE 2,176,859

PROCESS OF MAKING VINYL RESINS

George O. Morrison and Aubrey F. Price, Shawinigan Falls, Quebec, Canada, assignors to Shawinigan Chemicals Limited, Montreal, Quebec, Canada, a corporation of Canada No Drawing. Application December 13, 1937, Serial No. 179,614. In Great Britain December 28, 1933

22 Claims. (Cl. 260—73)

This invention relates in general to improvements in processes of making polyvinyl resins by hydrolysis of polyvinyl esters and especially polyvinyl acetate and condensation of the hydrolysis products with a body containing an active carbonyl group, such as an aldehyde or body yielding an aldehyde, and this application is a continuation in part from our former applications Ser. No. 759,318, filed December 26, 1934, and Ser. No. 102,626, filed September 25, 1936.

According to the aforesaid applications, polyvinyl esters are partially or completely hydrolyzed in presence of an organic solvent medium, water and an acid reacting catalyst and the hydrolysis products are condensed with a body containing an active carbonyl group, the condensation taking place either simultaneously with or subsequently to hydrolysis. During hydrolysis, acyl groups of the ester are replaced by hydroxyl groups and, during the condensation, the hydroxyl groups are reacted with aldehyde to form acetal groups. In application Ser. No. 759,318 there are disclosed special conditions for obtaining high percentage acetal reaction using saturated aliphatic or aromatic aldehydes and for obtaining high percentage acetal reaction combined with substantial absence of colour in the produced resins using formaldehyde or benzaldehyde, in each case using ester-alcohol mixtures or organic acids as solvent media. In application Ser. No. 102,626 there are disclosed the different special conditions for obtaining high percentage acetal reaction combined with substantial absence of colour in the produced resins using saturated aliphatic aldehydes containing at least two carbon atoms in the molecule and also using ester-alcohol mixtures or organic acids as solvent media.

The present invention is directed to a process of producing polyvinyl resins by partial or complete hydrolysis of polyvinyl esters and condensation of the hydrolysis products, either simultaneously with or after the hydrolysis, with a body containing an active carbonyl group such as a saturated or unsaturated aliphatic or an aromatic aldehyde, a cyclo aldehyde or a ketonic body, in presence of water, an acid reacting catalyst and a solvent medium being a lower aliphatic acid, preferably the acid corresponding to the polymer. More particularly, the invention lies in the special features of proportions and identities of reactants, times, temperatures, pressures and polymer viscosities and the relations thereof necessary for realizing an acetal reaction, over 80%, or the combination of an acetal reaction over 80% and substantial absence of colour in the produced resins.

In greater detail, the invention comprises the features and combinations of features disclosed in the foregoing and following description, together with such modifications thereof and substitutions therefor as are taught by the disclosure herein or as lie within the scope of the appended claims.

The primary object of the invention is to provide an improved process for the manufacture of polyvinyl resins.

Another object is to produce improved polyvinyl resins, in which the improvement resides in one or more of the following characteristics, namely, substantial absence of colour; substantial imperviousness to water and dilute alkalis; great strength, toughness, flexibility and elasticity; reasonable non-inflammability; high softening temperature; stability; and insolubility in numerous common organic solvents.

A further object is to produce resins suitable for the manufacture of sheets, rods, tubes and the like from which formed articles may be made by cutting, stamping, pressing or other suitable methods; films for wrapping and photographic purposes and for safety glass manufacture; threads for manufacture of artificial silk; high class surface coating compositions such as required for liners for bottle caps and other uses where insolubility in all ordinary solvents, non-toxicity and freedom from colour and odour are of the utmost importance; high class mouldings such as dentures; and for other purposes.

A still further object is to produce resins in the form of sheets, films, threads or fine granules directly from the solutions in which the resins are formed.

Various other objects and the advantages of the invention may be ascertained from the following description.

As to the resins, the foregoing objects are realized according to this invention by observing certain conditions which are essential to the realization of one or more of the stated characteristics in the resins.

It has been found that, in order to produce substantially colourless resins of the character described, it is necessary to use a suitable catalyst, and if this is an acid, it is necessary also to protect the resins against the discolouring action of the catalyst acid and, in some cases, to protect the aldehyde against the resinifying action of the catalyst acid on the aldehyde itself, and it has been found that the foregoing may be accomplished by carrying out the reaction in presence of a sufficient amount of water or alcohol or both. The protective action of water is due largely to dilution of the acid thereby. Water is preferable to alcohol in many instances as a protective agent as it protects the resin and/or the aldehyde from the catalyst acid and does not interfere with the concentration of aldehyde in the reaction mixture by combination to form an acetal. In order to avoid the use of alcohols or ester-alcohol mixtures, materials which are solvents for the resin and which permit of the addition of considerable water are indictaed. It has been found that aliphatic acids, such as acetic acid or propionic acid, or other solvents, such as dioxane, and the like, are suitable solvents in which to carry out the reaction. So far as colour alone is concerned, there does not appear to be any upper limit to the amounts of water that may be used, but upper limits are imposed by other considerations, such as economy, time and characteristics of the resin other than colour.

It has been found also that, contrary to what might be expected in view of its well known charring action on organic matter, sulphuric acid when properly diluted can be used as a catalyst in the production of colourless resins.

It has been found further that, in order to produce resins having a high degree of resistance to water and dilute alkalies, it is necessary to effect a high percentage reaction between hydroxyl groups and carbonyl groups and that, other conditions being correct, attainment of this high percentage reaction depends upon limiting the amounts of water in the reaction mixture to such extent as is necessary to obtain homogeneous reaction conditions, especially toward the end of the reaction, i. e., when the acetal reaction exceeds 80%. By "homogeneous conditions", we mean that the reaction medium is a solution, colloidal or otherwise. So far as the acetal reaction alone is concerned, the water could well be dispensed with but the resins produced would be dark coloured and useless for many purposes though admirable for others.

It has been found still further that in order to produce resins of improved strength, toughness, elasticity and high softening temperature, it is necessary to avoid using polymers of relatively low molecular weight and to secure a high percentage hydrolysis.

The expression "hydrolysis product of polyvinyl ester", or equivalent expression, as hereinafter used, is to be understood as indicating a substitution product of a polyvinyl ester in which product the molecule contains free hydroxyl groups capable of reacting with a body containing active carbonyl groups and irrespective of whether the molecule does or does not contain a residue of acyl groups and irrespective of whether it has or has not been partially reacted with a body containing carbonyl groups.

As previously stated, the hydrolysis reaction and the acetal reaction may be carried out sequentially or simultaneously. If these reactions are carried out separately, the catalyst and/or reaction media used in the one may be different from the catalyst and/or reaction media used in the other, or both reactions may be carried out using the same catalyst and reaction media.

It is preferred, however, to carry out the reactions simultaneously and this manner of operation imposes restrictions on the choice of catalyst.

For either hydrolysis or acetal reaction alone and for simultaneous hydrolysis and acetal reactions, suitable catalysts are sulphonic acids, certain strong semiorganic acids, for example, trichloracetic acid, and the mineral acids, such as sulphuric acid. Other materials, such as certain metal chlorides or sulphates, for example, zinc chloride, calcium chloride or sodium acid sulphate, which are known catalysts for acetal reactions, are not as desirable hydrolysis catalysts as those already named, but may be used to catalyze the acetal reaction when the same is performed subsequently to the hydrolysis.

The polymer viscosities herein referred to are determined according to the following method:

The polymer is dissolved in benzene and made up so that at 20° C. one litre contains the simple molecular weight in grammes. This is filtered into the apparatus through cotton-wool, precautions being taken to avoid loss of solvents. The time of outflow is then determined by the Ostwald viscosimeter, which has been standardized on a pure solvent (benzene) of which the absolute viscosity is known in centipoises.

A convenient method of determining softening temperatures of the resins is to place 10 grammes of mercury over a plug of the resin ¼ inch deep at the lower end of a 7 mm. tube and raise the temperature at the rate of 4° C. per minute. The temperature at which the mercury runs out is the softening temperature of the resin.

In the following examples which illustrate the carrying out of the invention at atmospheric pressure the proportions given are by weight throughout.

Example 1

100 parts of polymerized vinyl acetate having a viscosity of 15 centipoises is dissolved in 185 parts of glacial acetic acid. To this is added 32 parts paraformaldehyde, 40 parts water and 6.8 parts of concentrated sulphuric acid. The reaction is carried on for 25 hours at 70° C. in an enamelled vessel fitted with an agitator. 13 parts of ammonia solution is added to neutralize the catalyst acid and the reaction mixture is precipitated as threads or granules in water, washed, and dried in a current of warm air.

The finished resin is substantially colourless, 93.3% of the acyl groups have been removed and their replacement by reaction with formaldehyde is 92.5% complete.

The proportion of polyvinyl acetate to acetic acid can be varied widely, but if the ratio of acetic acid to water approaches 1:1, solubility difficulties are encountered.

Water has a definite effect on both the colour of the resin and on the completeness of the acetal reaction. If more than 30% of water based on the original polyvinyl acetate solution is used, low percentage acetal reaction results and, if less than 8% of water is used, colour difficulties are encountered. The temperature can vary between wide limits ranging from room temperature or below to well above the boiling point of the solvent mixture. The preferred temperature range using acetic acid as solvent is between 30° and 80° C. The amount of catalyst acid used is governed by the nature of the acid, the temperature employed, the amount of water used and the desired rate. If more than 10% of sulphuric acid based on the original polyvinyl ester solution is used, colour difficulties are encountered and, if less than 0.6% of catalyst acid is used, lower percentage acetal reaction is encountered. The ratio of catalyst acid to water should not be greater than 1:3. The maximum temperature that may be employed with 0.6% of catalyst acid is 90° C. Lowering or raising the temperature 10° C. should be accompanied by doubling or halving the amount of catalyst acid. Lower temperatures than the maximum limits may be used and lower temperatures for a given set of conditions improve the colour of the resin, but adversely affect the percentage acetal reaction.

Resins produced according to the teaching in connection with the foregoing example and within the limits set forth in the teaching are characterized by substantial absence of colour and by acetal reaction of 90% or higher. As one progresses upwards from the lower of said limits of water and downwards from the upper of said limits of catalyst acid and temperature, substantial absence of colour is maintained but the percentage acetal reaction falls off gradually. Conversely, as one progresses downwards from the upper of said limits of water and upwards from the lower of said limits of catalyst acid and temperature, the percentage acetal reaction increases gradually from approximately 90% but, after the lower of said limits of water and the upper of said limits of catalyst acid and temperature are passed, colour becomes evident and increases rapidly.

The proportions of solvent to polymer depend chiefly upon the viscosity of the polymer and the nature of the solvent, the proportions being preferably such as will produce a reacting solution of viscosity convenient for working. For example, solutions having viscosity of 20 to 100 poises at 20° C. have been found convenient, but solutions of lower and higher viscosities may be used.

The proportion of aldehyde to polymer depends upon the percentage hydrolysis and acetal reaction desired and the amount ranges upwards from a minimum of approximately 25% excess over that theoretically required to form the desired polyvinyl acetal.

Since most of the variables involved in the combined hydrolysis and acetal reaction are inter-related and some are selective at will for convenience or expediency, it is impossible to give numerical limits covering at the same time the whole range of polymer viscosities, polymer concentrations in solutions or percentage hydrolysis which can be used. A set of proportion limits suitable for a polymer of given viscosity or given concentration in a given solvent might be ridiculous or impossible for a polymer of widely different viscosity or for a widely different polymer concentration in solution or for a different solvent.

Limits of catalyst acid, water and temperature and the relations of these as set forth in connection with the example apply to conditions of polymer viscosity, polymer concentration in solution and to the solvent as stated in the example and to a limited range above and below.

The principles involved apply to the entire range of polymer viscocities, polymer concentration in solution and percentage hydrolysis and the application of these principles throughout the ranges of polymer viscosities, polymer concentrations in solution and percentage hydrolysis will be readily understood by those skilled in the art, from the teaching of the example and the observations following it.

The proportions of constituents in the reaction media change continuously throughout the course of the reactions and the limits given in connection with the example are intended to include all resulting proportions encountered during progress of the reactions. These conditions may be approached by employing combinations of initial conditions outside the limits given or other materials capable of giving similar conditions during the course of the hydrolysis.

The following Examples 2 to 7 serve to illustrate application of the foregoing principles to a wide range of polymer viscosities, and a considerable range of polymer concentrations in solution.

Example 2

100 parts of polymerized vinyl acetate having a viscosity of 2.5 centipoises is dissolved in 100 parts of glacial acetic acid. To this are added 88 parts of Formalin solution (38% HCHO) and 4.74 parts of concentrated sulphuric acid. The reaction is carried on for 24 hours at 70° C. in an enamelled vessel fitted with an agitator, 9 parts of ammonia solution is added, which is an excess over that required to neutralize the catalyst acid. The resin is recovered from the reaction mixture by any suitable means, washed to remove salts and dried.

The finished resin is pale yellow in colour, 93.6% of the acyl groups have been removed and reaction of the substituted hydroxyl groups with formaldehyde is 92.5% complete.

The amount of acetic acid used can be varied, 67 parts give satisfactory reaction conditions and, of course, more than 100 parts may be used. The amount of Formalin solution may vary widely. When less than 55 parts are used, there is a tendency for the percentage acetal reaction to be lowered. More Formalin may of course be used, the limiting factor being the presence of too much water, so that solution conditions are upset.

The temperature may vary; lower temperature, using the above proportions would mean slower hydrolysis rate, and resin freer from colour, while the percentage acetal reaction would remain approximately unchanged. Higher temperature would increase the rate of reaction and tend to darken the resin. The temperature chosen is governed by the colour limits allowed in the finished resin The neutralizing material should be slightly in excess of that necessary to neutralize the mineral acid. Bases, weak acid salts or carbonates are satisfactory. For some purposes, materials which give soluble sulphates and/or acetates, such as potassium or ammonia, are preferable.

This resin is a hard, easily crushed material and is soluble in acetic acid, dioxane, chloroform, tetrachlorethane, etc., and insoluble, or practically so, in benzene, toluene, alcohols and esters such as ethyl, butyl, etc. It is useful as a protective coating and for other purposes where its solubility properties and the low viscosity of its solutions are advantageous.

Example 3

100 parts of polymerized vinyl acetate having a viscosity of 6 centipoises is dissolved in 150 parts glacial acetic acid. To this are added 72 parts of Formalin solution (38% HCHO) and 5.5 parts of concentrated sulphuric acid. The reaction is carried on for 21 hours at 70° C., the catalyst neutralized and the resin worked up as in Example 2.

The finished resin is substantially colourless, 89.0% of the acyl groups have been removed and their replacement by reaction with formaldehyde is 90.7% complete.

This resin is a hard material which has the same solubility as the resin in Example 2. It is useful as a protective coating and can be used for moulding purposes alone or when incorporated with suitable fillers, dyes, pigments and plasticizers, to produce a wide variety of articles such as dentures, drinking vessels, toilet articles, ornaments, portions of electrical apparatus and many others.

For the production of resins having great strength, flexibility, elasticity and high softening temperature and which are insoluble in numerous common organic solvents, it is necessary, when working with polyvinyl acetate, (i) That the polyvinyl acetate used have a viscosity of not less than 10 centipoises (as determined by the method previously given) corresponding to an average molecular weight believed to be approximately 15,000, and preferably have a viscosity above 15 centipoises corresponding to an average molecular weight believed to be approximately 22,500;

(ii) That the ester be at least 80% and preferably above 90% hydrolyzed, i. e., that the acyl groups be replaced to a minimum extent of 80% and preferably above 90% during the hydrolysis;

(iii) That the acetal reaction proceed to at least 90% of completion, i. e., that the hydroxyl groups introduced by hydrolysis be at least 90% replaced by acetal groups during the condensation with aldehyde.

Where very high softening points and elasticity are required, as in threads or films, it is desirable to use polyvinyl acetate with viscosity of or over 45 centipoises, corresponding to an average molecular weight believed to be approximately 67,500, and to hydrolyze the same over 90%.

*Example 4*

100 parts of polymerized vinyl acetate having a viscosity of 45 centipoises is dissolved in 300 parts glacial acetic acid. To this are added 124 parts of Formalin solution (38% HCHO) and 9.5 parts concentrated sulphuric acid. The reaction is carried out for 12½ hours at 70° C. as in Example 2. The neutralized reaction liquid is precipitated as threads in water, washed and dried in a current of warm air or, instead of precipitating the resins in thread form in water, water may be added to the reaction mixture, with or without previous neutralization of the catalyst acid, until with agitation the resin is precipitated in small granules whch may be separated from the liquid by filtration or otherwise. The addition of water is preferably such as to bring the acetic acid concentration down to 15% to 25% of the reaction mixture. This method of recovering the resins is particularly applicable to those of high hydrolysis and high acetal reaction. This method of recovering the resin is particularly useful in connection with resins made in a fatty acid corresponding to the polymer used, as both the solvent acid and that liberated during the reaction may be readily recovered.

The finished resin is practically free from colour, 89% of the acyl groups have been removed and their replacement by reaction with formaldehyde is 94% complete.

This resin can be dissolved readily to give a clear faintly coloured varnish in the same solvents as outlined in Example 2.

*Example 5*

100 parts of polyvinyl acetate having a viscosity of 150 centipoises is dissolved in 570 parts of glacial acetic acid. To this are added 200 parts Formalin solution (38% HCHO) and 15 parts concentrated sulphuric acid. The reaction is carried out for 30 hours at 70° C. and the resin is separated as in Example 4.

The resin is substantially colourless and is materially tougher, stronger and more elastic than the resins of Example 4 and is insoluble in most organic solvents. The hydrolysis has gone 92% and the acetal reaction 94.7%.

From the teaching in connection with Example 1 and the embodiments of this teaching in Examples 2 to 5, it will be apparent to those skilled in the art that resins characterized by substantial absence of colour and by high percentage acetal reaction may be produced using polymers of viscosities, polymer concentrations in solution, percentages of hydrolysis, catalysts and temperatures, one or more of which are outside their respective ranges as disclosed by the examples. The teaching in connection with Example 1 relating to production of resins characterized by good colour irrespective of percentage acetal reaction and to production of resins characterized by high percentage acetal reaction irrespective of colour applies also to production of such resins under conditions within and beyond the wider ranges of polymer viscosities, polymer concentration in solution, solvents and percentage hydrolysis disclosed by Examples 2 to 5.

The foregoing examples and the teaching in connection therewith cover variations of a process in which hydrolysis and acetal reaction are carried out simultaneously to produce resins characterized by substantial absence of colour or by high acetal reaction or by both high acetal reaction and substantial absence of colour and in which the hydrolysis may be partial or complete.

In practising this invention, the hydrolysis reaction and the acetal reaction may be performed sequentially. The acetal reaction may follow immediately after the hydrolysis reaction using the reaction media of the hydrolysis with or without modification thereof, or the acetal reaction may be completely isolated from the hydrolysis reaction as to time, place and conditions, or the conditions may be intermediate.

The hydrolysis reaction may be carried out under various conditions so as to produce either coloured or colourless hydrolysis products. In the latter case, it is essential to carry out the hydrolysis in presence of sufficient water to protect the polymer, its hydrolysis product and possibly the solvent, if any is used, against any discolouring action of the catalyst, substantially as explained in connection with simultaneous hydrolysis and acetal reactions.

An outstanding difference between an acetal reaction performed simultaneously with hydrolysis as already described and an acetal reaction performed subsequently to hydrolysis is the much wider range in the variety and amounts of catalysts allowable in the latter case. These may range from the catalysts and amounts thereof as herein specified for simultaneous hydrolysis and acetal reaction through the same catalysts in lesser amounts, to other known catalysts for acetal reactions.

For production of substantially colourless acetal reaction products, it is necessary to start with a substantially colourless hydrolysis product and to protect the resin, and if necessary the aldehyde, from being discoloured by the catalyst. This protection ranges from the limits previously set forth for simultaneous hydrolysis and acetal reactions to as little protection as is required in the case of mild catalysts such as calcium chloride.

For production of resins with high percentage acetal reaction, the reaction media must be so adjusted that homogeneous conditions are obtained especially toward the end of the reaction, and the limits for water, catalyst and temperature previously set forth for simultaneous hydrolysis and acetal reaction apply also to the separate acetal reaction, except in the case of mild catalysts where much larger amounts thereof are indicated.

For production of substantially colourless resins with high percentage acetal reaction, it is necessary to start with a substantially colourless hydrolysis product and to adjust the reaction media so as to obtain homogeneous conditions especially toward the end of the reaction and to work in the field which is common to the ranges last set forth for production of substantially colourless resins and for production of high acetal resins.

If the acetal reaction is carried out in the hydrolysis reaction media without modification thereof, it is obvious the conditions to obtain colourless resins with high acetal reaction must be as previously described for simultaneous hydrolysis and acetal reaction. If the catalyst remaining in the hydrolysis reaction media is neutralized and replaced by a milder catalyst or is partially neutralized, less water and higher temperatures may be used without adversely affecting the colour of the resin and with benefit to the acetal reaction. It is to be noted that when the acetal reaction is effected in the unchanged hydrolysis media, hydrolysis will continue during the acetal reaction period in a manner similar to that set forth for simultaneous reaction.

The following Examples 6 and 7 illustrate processes for producing resins characterized by high percentage acetal reaction and substantial absence of colour, in which processes the hydrolysis and acetal reaction are sequential.

Example 6

100 parts of polyvinyl acetate having a viscosity of 10 centipoises is dissolved in 185 parts of glacial acetic acid. To this are added 40 parts of water and 6.8 parts of concentrated sulphuric acid. Hydrolysis is carried out during 7 hours at 70° C. in an enamelled vessel fitted with an agitator. 32 parts of paraformaldehyde is added and the reaction is carried on during another hour at 70° C. 13 parts of ammonia solution (sp. gr. 90) is added to neutralize the mineral acid and the resin is precipitated from the reaction mixture in water, washed and dried in a current of warm air.

Alternatively, the mixture is only initially heated and the reaction is allowed to proceed without external heating until the acetal reaction goes 90% or over. Alternatively, the initial heating may be omitted.

The finished resin is substantially colourless, 68% of the acyl groups have been removed and their replacement by reaction with formaldehyde is 92.7% complete.

The conditions as to water, catalyst and temperature may be varied within the limits given in connection with Example 1.

Alternatively, after the addition of the paraformaldehyde, the temperature may be allowed to drop to any desired temperature or the reaction mass may be cooled to any desired temperature. This will serve to slow down the hydrolysis during the acetal reaction period and will require slightly longer acetal reaction period.

Example 7

To 100 parts of substantially colourless polyvinyl alcohol prepared from polyvinyl acetate having a viscosity of 6 centipoises, there are added 350 parts of glacial acetic acid and 175 parts Formalin (38% HCHO) in which 22 parts of zinc chloride has been dissolved. The mixture is reacted for 5 hours at 70° C. in an enamel lined vessel fitted with an agitator. At the end of this time, the acetal reaction has gone to 90% of completion and the resin when separated has the same characteristics as the resin produced according to Example 5.

Owing to the use of a mild catalyst, there is little or no need to observe precautions for protection of the resin or the aldehyde and, in consequence, the limits for protection against the catalyst taught in connection with Example 1, do not apply. On the other hand, the limits taught in connection with Example 1 as necessary to obtaining a high percentage acetal reaction do apply.

The following example illustrates the application of the process to making polyvinyl resins using saturated aliphatic aldehydes containing at least two carbon atoms in the molecule, which resins are characterized by a high percentage acetal reaction and substantial absence of colour. The difference between the application of the process in this example and that dealt with in the previous examples is, in general, that the influences of the various variables are in part in different direction and of different order of magnitude so that the combination of high percentage acetal reaction and substantial absence of colour lies in a different range of conditions.

Example 8

100 parts of polymerized vinyl acetate having a viscosity of 15 centipoises are dissolved in 185 parts of 50 per cent aqueous acetic acid. To this are added 33 parts of paraldehyde and 13.6 parts of concentrated sulphuric acid. The reaction is carried out for 11 hours at 50° C. in an enamelled vessel fitted with an agitator. 17 parts of sodium hydroxide in the form of a 20% aqueous solution are added to neutralise the catalyst acid and the reaction mixture in then precipitated in water, washed and dried in warm air.

The finished resin is substantially colourless, 73.4% of the acyl groups have been removed and their replacement by reaction with aldehyde is 92%.

Water has a definite effect on both the colour of the resin and on the completeness of the acetal reaction. If more than 45% of water based on the original polyvinyl acetate solution is used, low percentage acetal reaction results and if less than 25% of water is used colour difficulties are encountered. The temperature can vary between wide limits ranging from room temperature or below to well above the boiling point of the solvent mixture. The preferred temperature is 30° to 60° C. The amount of catalyst acid used is governed by the nature of the acid, the temperature employed, the amount of water used and the desired rate. If more than 15% of sulphuric acid based on the original polyvinyl ester solution is used, colour difficulties are encountered. The ratio of catalyst acid to water should not be greater than 1:3.

Resins produced according to the teaching in connection with Example 8 and within the limits set forth in the teaching are characterized by substantial absence of colour and by acetal reaction of 85% or higher. As one progresses upwards from the lower of said limits of water and upwards from the lower of said limits of catalyst acid and temperature, substantial absence of colour is maintained but the percentage acetal reaction falls off gradually. Conversely, as one progresses downwards from the upper of said limits of water and downwards from the upper of said limits of catalyst acid and temperature, the percentage acetal reaction increases gradually from approximately 85% but, after the lower of said limits of water and the lower of said limits of catalyst acid and temperature are passed, colour becomes evident and increases rapidly.

The general observations following Example 1 as to proportions of solvent to polymer, proportion of aldehyde to polymer, variables and limits of catalyst acid and water principles involved and change in proportions of constituents during reaction, apply also to Example 8 with the addition that there is an upper limit of the amount of aldehyde of the order of 200% beyond which colour difficulties are encountered.

From all the foregoing teaching, it will be apparent to those skilled in the art that resins characterized by substantial absence of colour and by high percentage acetal reaction may be produced employing sequential steps of hydrolysis and acetal reaction and using polymers of viscosities, hydrolysis products, concentrations in solution, percentages of hydrolysis, catalysts and temperatures, one or more of which are outside their respective ranges as already disclosed.

Examples 6 and 7 and the teaching in connection therewith cover variations of a process in which hydrolysis and acetal reaction are carried out sequentially to produce resins characterized by substantial absence of colour or by high percentage acetal reaction, or by both high percentage acetal reaction and substantial absence of colour, and in which the hydrolysis may be partial or complete.

The limits of water, catalyst and temperature taught for obtaining resins characterized by high percentage acetal reaction apply equally to acetal reactions conducted simultaneously with or subsequently to hydrolysis.

Proceeding according to the teaching of the foregoing general statements and the examples and varying one or more, the proportions, times, temperatures, solvents, catalysts, carbonyl containing body and the viscosity of the polymer, and the polymer concentration in solution, one skilled in the art may produce resins of characteristics differing as desired from those herein specifically disclosed or may produce substantially identical products under different conditions of manufacture. While the process is preferably carried out at atmospheric pressure, the pressure may be above or below atmospheric.

The resins produced according to any of Examples 1, 4, 5 and 8 are suitable for manufacture of waterproof wrapping films and safety glass, also films for photographic purposes. The resins produced according to Examples 4 and 5 are suitable for the manufacture of threads for artificial silk, those from the higher viscosity polymers being the best. Any of these resins are suitable for manufacture of high class surface coating compositions.

The resins of Examples 1 to 5, 7 and 8 are useful as a coating for liners of bottle caps or as a lacquer for the caps themselves, owing to their insolubility in all ordinary solvents, non-toxicity and freedom from colour and odour.

The resins have good dielectric properties and all may be used as an insulating lacquer on wire, while those from the lower viscosity polymers may be used in moulding the insulating parts of electrical apparatus.

The conditions already described as to catalysts, solvents, water, temperatures, polymer viscosities and concentration in solution, pressure and percentage hydrolysis and acetal reactions apply in general also to cases in which the hydrolyzed polymer is condensed with a saturated aliphatic aldehyde containing more than two carbon atoms in the molecule and apply in particular when propylaldehyde or butyraldehyde are used.

The pure resins are obtained by removing the catalyst acid and solvent. These operations may be performed in various ways and relations to the use of the resins. The catalyst acid may be neutralized in the original resin solution as described in connection with Example 1, or otherwise, and the resin solution then may be extruded in the form of sheets, films or threads into air or into a precipitation bath, dried for removal of solvent, washed free from salts and finally dried.

Alternatively, the resin solutions may be extruded without previous neutralization of the catalyst acid, washed for removal of acid and dried for removal of solvents.

The resins of this invention in film, thread or granule form may be treated for reduction in the percentage of free hydroxyl groups therein by exposing them to vapours of formaldehyde, phenyl isocyanate, ketene or other suitable material.

Proceeding in general along the lines already described, useful resins may be obtained from other polyvinyl esters, such as polyvinyl proprionate and polyvinyl butyrate. Polyvinyl formate is believed to be an exception. When dealing with these other ester polymers, it is desirable that the aliphatic acids used as solvents be those corresponding to the polyvinyl ester, so as to avoid formation of mixed acids in the solvent. Thus, propionic acid is preferable with polyvinyl propionate and similarly in the case of polyvinyl butyrate.

In the following claims, the terms "aldehyde", "formaldehyde" and "acetaldehyde" are to be understood as including bodies capable of yielding an aldehyde or formaldehyde or acetaldehyde, as the case may be, in the reaction.

Having thus described our invention, what we claim is:

1. A process of making polyvinyl resins which comprises reacting on an hydrolysis product of a polyvinyl ester other than polyvinyl formate, with a body containing an active carbonyl group capable of combining with the hydroxyl groups of the hydrolysis product, in presence of a catalyst and a lower saturated aliphatic acid in which the hydrolysis product is initially dissolved.

2. A process of making polyvinyl resins which comprises reacting on an hydrolysis product of a polyvinyl ester other than polyvinyl formate, with a body containing an active carbonyl group capable of combining with the hydroxyl groups of the hydrolysis product, in presence of a catalyst and a saturated aliphatic acid corresponding to the polyvinyl ester used in which acid the hydrolysis product is initially dissolved.

3. A process of making polyvinyl resins which comprises reacting together a polyvinyl ester other than polyvinyl formate, water and a body containing an active carbonyl group capable of combining with hydroxyl groups introduced by hydrolysis of the polyvinyl ester, the reaction being conducted in presence of a catalyst and a lower saturated aliphatic acid in which the polymer is initially dissolved.

4. A process of making polyvinyl resins which comprises reacting together a polyvinyl ester other than polyvinyl formate, water and a body containing an active carbonyl group capable of combining with hydroxyl groups introduced by hydrolysis of the polyvinyl ester, the reaction being conducted in presence of a catalyst and a lower saturated aliphatic acid corresponding to the polyvinyl ester used and in which the ester is initially dissolved.

5. A process of making polyvinyl resins which comprises reacting on an hydrolysis product of a polyvinyl ester other than polyvinyl formate, with a saturated aliphatic aldehyde, in presence of a catalyst and a lower saturated aliphatic acid in which the hydrolysis product is initially dissolved.

6. A process of making polyvinyl resins which comprises reacting on an hydrolysis product of a polyvinyl ester other than polyvinyl formate, with a saturated aliphatic aldehyde in presence of a catalyst and a saturated aliphatic acid corresponding to the polyvinyl ester used in which acid the hydrolysis product is initially dissolved.

7. A process of making polyvinyl resins which comprises reacting together a polyvinyl ester other than polyvinyl formate, water and a saturated aliphatic aldehyde, the reaction being conducted in presence of a catalyst and a lower saturated aliphatic acid in which the polymer is initially dissolved.

8. A process of making polyvinyl resins which comprises reacting together a polyvinyl ester other than polyvinyl formate, water and a saturated aliphatic aldehyde, the reaction being conducted in presence of a catalyst and a lower saturated aliphatic acid corresponding to the polyvinyl ester used and in which the ester is initially dissolved.

9. A process of making substantially colourless polyvinyl resins characterized by a high percentage replacement of hydroxyl groups, which process comprises reacting on an hydrolysis product of a polyvinyl ester other than polyvinyl formate in solution in a lower saturated aliphatic acid corresponding to the polymer, with a body containing active carbonyl groups capable of reacting with free hydroxyl groups of the hydrolys's product, in presence of a catalyst and water, the water being present in amount between the minimum which will protect the carbonyl containing body and the produced resin from discolouration by the catalyst and the maximum compatible with maintaining homogeneous reaction conditions when the acetal reaction exceeds 80%.

10. A process of making substantially colourless polyvinyl resins characterized by a high percentage replacement of hydroxyl groups, which process comprises reacting together a polyvinyl ester other than polyvinyl formate in solution in a lower saturated aliphatic acid corresponding to the polymer, with a body containing active carbonyl groups capable of reacting with free hydroxyl groups of the hydrolysis product, in presence of a catalyst and water, the water being present in amount between the minimum which will protect the carbonyl containing body and the produced resin from discolouration by the catalyst and the maximum compatible with maintaining homogeneous reaction conditions when the acetal reaction exceeds 80%.

11. A process of making substantially colourless polyvinyl resins characterized by a high percentage replacement of hydroxyl groups, which process comprises reacting on an hydrolysis product of a polyvinyl acetate, in solution in acetic acid, with an aldehyde in presence of a catalyst and water, the water being present in amount between 8% and 30% of the solution.

12. A process of making substantially colourless polyvinyl resins characterized by a high percentage replacement of hydroxyl groups, which process comprises reacting together a polyvinyl acetate in solution in acetic acid, an aldehyde and water in presence of an acid reacting catalyst, the water being present in amount between 8% and 30% of the polymer solution.

13. A process of making substantially colourless polyvinyl resins which comprises reacting on an hydrolysis product of a polyvinyl acetate, in solution in acetic acid, with an aldehyde in presence of sulphuric acid as catalyst and water, the water being present in amount upwards of 8% of the solution and the catalyst acid being present in amount less than 10% of the solution with a maximum ratio to water of 1:3.

14. A process of making polyvinyl resins characterized by a high percentage replacement of hydroxyl groups, which comprises reacting on an hydrolysis product of a polyvinyl acetate, in solution in acetic acid, with an aldehyde in presence of a catalyst and water, the water being present in amount less than would interfere with maintenance of homogeneous reaction conditions when the acetal reaction exceeds 80% and being less than 30% of the solution.

15. A process of making polyvinyl resins which comprises reacting on an hydrolysis product of a polyvinyl ester other than polyvinyl formate with an aldehyde in presence of a catalyst and an aliphatic acid corresponding to the polyvinyl ester as solvent, the aliphatic acid being present in amount capable of maintaining homogeneous reaction conditions when the acetal reaction is 90% complete or more.

16. A process of making polyvinyl resins which comprises reacting on an hydrolysis product of a polyvinyl acetate with an aldehyde chosen from the group consisting of formaldehyde and benzaldehyde in presence of a catalyst, water and acetic acid as an initial solvent, the acid being present in amount sufficient to maintain homogeneous reaction conditions when the acetal reaction is 90% complete or more and the water being present in amount sufficient to protect the formed resin and the aldehyde against discolouring action of the catalyst.

17. A process of making polyvinyl resins which comprises reacting together, a polyvinyl acetate having a viscosity of not less than 10 centipoises, water and formaldehyde in presence of sulphuric acid as catalyst and acetic acid as an initial solvent until hydrolysis proceeds to at least 80% of completion and the acetal reaction proceeds to at least 90% of completion.

18. A process of making substantially colourless polyvinyl resins, which comprises reacting together, a polyvinyl acetate in solution in acetic acid, formaldehyde and water in presence of sulphuric acid as catalyst, the sulphuric acid being present in amount less than 10% of the polymer solution and the water being present in amount sufficient to protect the aldehyde and the formed resin from discolouration by the catalyst acid and in any case more than 8% of the polymer solution, the ratio of catalyst acid to water ranging downwards from a maximum of the order of 1:3 for a reaction temperature of approximately 70° C.

19. A process of making substantially colourless polyvinyl resins characterized by a high percentage replacement of hydroxyl groups, which process comprises reacting on an hydrolysis product of a polyvinyl ester other than polyvinyl formate in solution in an aliphatic acid corresponding to the polymer, with a saturated aliphatic aldehyde containing at least two carbon atoms in the molecule, in presence of a catalyst and water, the water being present in amount between the minimum which will protect the aldehyde and the produced resin from discolouration by the catalyst and the maximum compatible with maintaining homogeneous reaction conditions when the acetal reaction exceeds 85%.

20. A process of making substantially colourless polyvinyl resins characterized by a high percentage replacement of hydroxyl groups, which process comprises reacting on an hydrolysis product of a polyvinyl acetate, in solution in acetic acid, with a saturated aliphatic aldehyde containing at least two carbon atoms in the molecule in presence of a catalyst and water, the water being present in amount between 25% and 45% of the solution.

21. A process of making polyvinyl resins which comprises reacting on an hydrolysis product of a polyvinyl acetate with acetaldehyde in presence of a catalyst, water and acetic acid as an initial solvent, the acid being present in amount sufficient to maintain homogeneous reaction conditions when the acetal reaction is 85% complete or more and the water being present in amount sufficient to protect the formed resin and the acetaldehyde against discolouring action of the catalyst.

22. A process of making substantially colourless polyvinyl resins, which comprises reacting together, a polyvinyl acetate in solution in acetic acid, acetaldehyde and water in presence of sulphuric acid as catalyst, the sulphuric acid being present in amount less than 15% of the polymer solution and the water being present in amount sufficient to protect the aldehyde and the formed resin from discolouration by the catalyst acid and in any case more than 25% of the polymer solution, the ratio of catalyst acid to water ranging downwards from a maximum of the order of 1:3 for a reaction temperature of approximately 50° C.

GEORGE O. MORRISON.
AUBREY F. PRICE.